United States Patent
Zhao et al.

(10) Patent No.: US 10,652,534 B2
(45) Date of Patent: May 12, 2020

(54) METHODS AND APPARATUS FOR DIRECTIONAL INTRA PREDICTION IN VIDEO COMPRESSION

(71) Applicant: TENCENT AMERICA LLC, Palo Alto, CA (US)

(72) Inventors: Xin Zhao, San Diego, CA (US); Xiang Li, San Jose, CA (US); Shan Liu, San Jose, CA (US); Liang Zhao, Sunnyvale, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/223,872

(22) Filed: Dec. 18, 2018

(65) Prior Publication Data

US 2019/0281289 A1   Sep. 12, 2019

Related U.S. Application Data

(60) Provisional application No. 62/640,544, filed on Mar. 8, 2018.

(51) Int. Cl.
*H04N 19/176* (2014.01)
*H04N 19/11* (2014.01)
*H04N 19/196* (2014.01)

(52) U.S. Cl.
CPC ........... *H04N 19/11* (2014.11); *H04N 19/176* (2014.11); *H04N 19/196* (2014.11)

(58) Field of Classification Search
CPC combination set(s) only.
See application file for complete search history.

(56) References Cited

U.S. PATENT DOCUMENTS

| | | | | |
|---|---|---|---|---|
| 2012/0170652 A1* | 7/2012 | Guo | | H04N 19/176 375/240.12 |
| 2014/0079122 A1* | 3/2014 | Kondow | | H04N 19/176 375/240.12 |
| 2014/0133558 A1* | 5/2014 | Seregin | | H04N 19/176 375/240.12 |
| 2015/0003524 A1* | 1/2015 | Yamamoto | | H04N 19/587 375/240.12 |

(Continued)

OTHER PUBLICATIONS

Zhang, et al., "Intra mode coding with fixed length binarization", Joint Collaborative Team on Video Coding (JCT-VC) of ITU-T SG16 WP3 and ISO/IEC JTC1/SC29/WG11, MediaTek Inc., Nov. 2011 (5 pages).

(Continued)

*Primary Examiner* — Md N Haque
(74) *Attorney, Agent, or Firm* — Sughrue Mion, PLLC

(57) ABSTRACT

A method of and an apparatus for controlling intra and/or inter prediction for decoding of a video sequence are provided. The method includes determining a total number of intra prediction modes for a current block, a number of Most Probable Modes (MPMs) in the current block, and a number of non-MPMs in the current block, wherein the total number of intra prediction modes for the current block is equal to a sum of the number of MPMs in the current block and the number of non-MPMs in the current block. The method further includes adjusting the total number of intra prediction modes to a value such that the number of non-MPMs is a power of 2 or a sum of multiple power of 2.

20 Claims, 16 Drawing Sheets

(56) References Cited

U.S. PATENT DOCUMENTS

| | | | | |
|---|---|---|---|---|
| 2015/0341638 A1* | 11/2015 | Francois | ................ | H04N 19/11 |
| | | | | 375/240.12 |
| 2017/0078695 A1* | 3/2017 | Guo | ..................... | H04N 19/176 |
| 2017/0332084 A1* | 11/2017 | Seregin | ................ | H04N 19/159 |
| 2017/0353730 A1* | 12/2017 | Liu | ...................... | H04N 19/122 |
| 2018/0205946 A1* | 7/2018 | Zhang | ................... | H04N 19/11 |

OTHER PUBLICATIONS

Panusopone, et al., "Weighted Angular Prediction", Joint Video Exploration Team (JVET) of ITU-T SG 16 WP 3 and ISO/IEC JTC 1/SC 29/WG 11, ARRIS, Mar. 3-Apr. 7, 2017 (4 pages).

Zhang, et al., "Intra Mode Coding in HEVC Standard", MediaTek USA Inc—Nov. 2012 (6 pages).

* cited by examiner

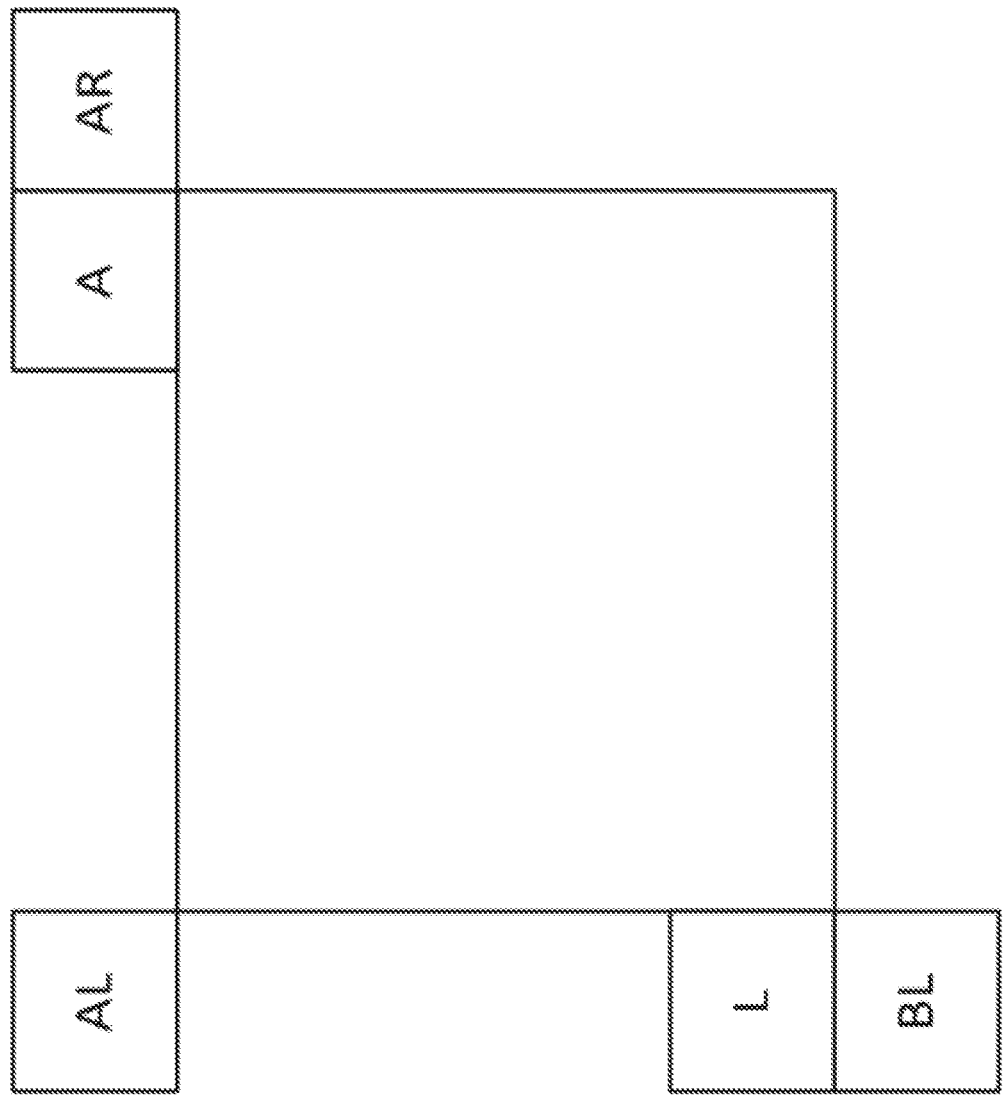

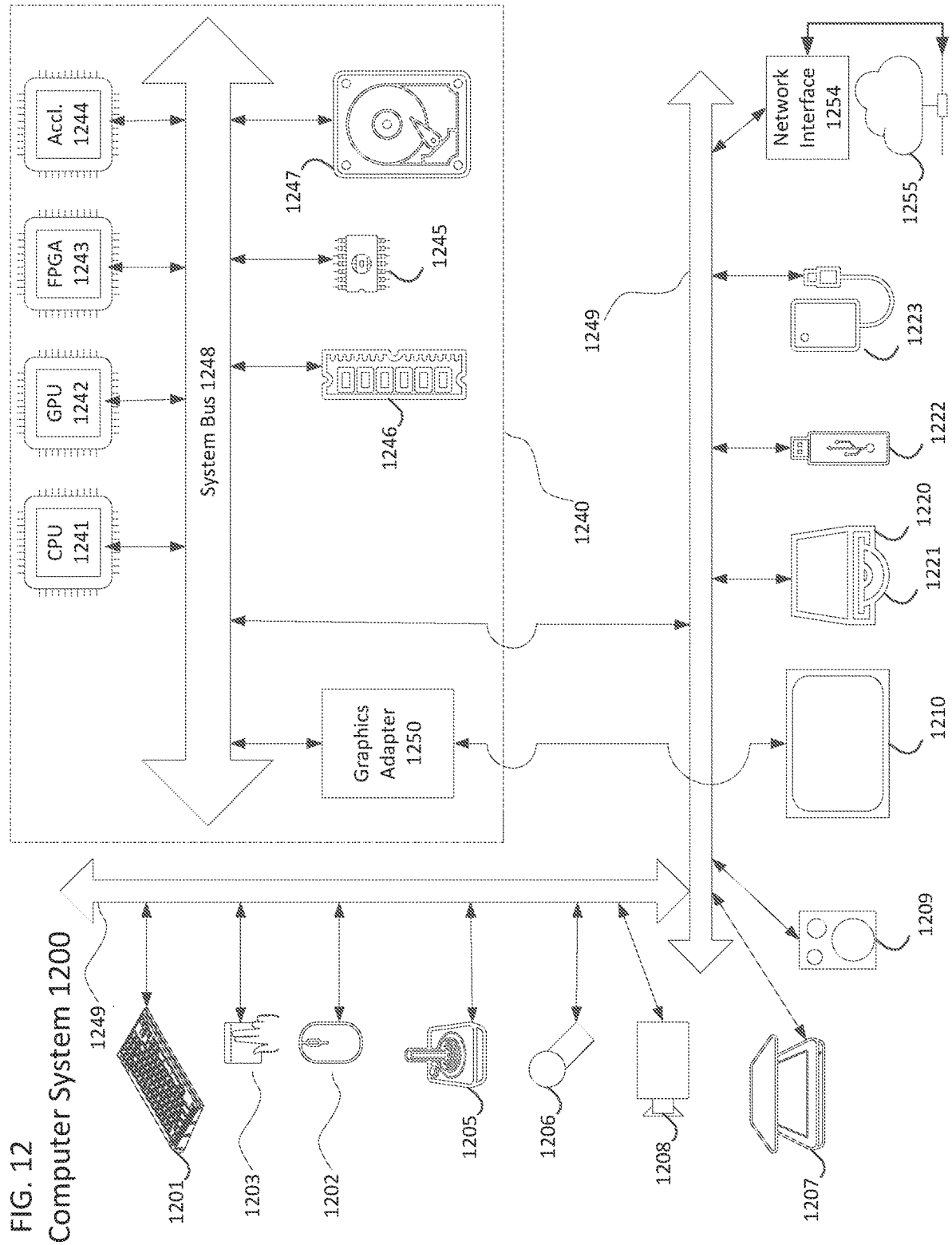

METHODS AND APPARATUS FOR DIRECTIONAL INTRA PREDICTION IN VIDEO COMPRESSION

CROSS-REFERENCE TO RELATED APPLICATION

This application claims priority from U.S. Provisional Patent Application No. 62/640,544, filed on Mar. 8, 2018, in the United States Patent and Trademark Office, which is incorporated herein by reference in its entirety.

BACKGROUND

1. Field

Methods and apparatuses consistent with embodiments relate to video processing, and more particularly, methods and apparatus for directional intra prediction in video compression.

2. Description of Related Art

The video coding standard HEVC (High Efficiency Video Coding) main profile was finalized in 2013. Soon after that the international standard organizations, ITU-T VCEG (Q6/16) and ISO/IEC MPEG (JTC 1/SC 29/WG 11), started exploring the needs for developing a future video coding standard with the potential to significantly enhance the compression capability compared with the current HEVC standard (including its current extensions). The groups are working together on this exploration activity in a joint collaboration effort known as the Joint Video Exploration Team (JVET) to evaluate compression technology designs proposed by their experts in this area. A Joint Exploration Model (JEM) has been developed by JVET to explore the video coding technologies beyond the capability of HEVC, and current latest version of JEM is JEM-7.1.

The following section describes the intra prediction mechanisms in existing HEVC standard and JEM development, describes the intra prediction mode coding method in JEM.

The intra prediction modes used in HEVC and JEM are illustrated in FIGS. 1A and 1B. To capture the arbitrary edge directions presented in natural video, the number of directional intra modes is extended from 33, as used in HEVC, to 65. As shown in FIGS. 1A and 1B, all the direction are symmetric along the diagonal direction, vertical direction, and horizontal direction. As shown in FIG. 1A, there are 35 intra prediction modes in HEVC. In HEVC, mode 10 is horizontal mode, mode 26 is vertical mode, and mode 2, mode 18 and Mode 34 are diagonal mode. As shown in FIG. 1B, there are 67 intra prediction modes in JEM. The additional directional modes in JEM on top of HEVC are depicted as gray dotted arrows in FIG. 1B, and the planar and DC modes remain the same. These denser directional intra prediction modes apply for all block sizes and for both luma and chroma intra predictions. In JEM, mode 18 is horizontal mode, mode 50 is vertical mode, and mode 2, mode 34, and mode 66 are diagonal mode. As illustrated in FIG. 1B, mode 2~mode 18 are called Region 1 modes, mode 18~mode 33 are called Region 2 modes, mode 34~mode 50 are called Region 3 modes, and mode 50~mode 66 are called Region 4 modes. Region 1 and Region 2 are together called Mode Set 0, and Region 3 and Region 4 are together called Mode Set 1.

To accommodate an increased number of directional intra modes, an intra mode coding method with 6 Most Probable Modes (MPMs) is used. Two major technical aspects are involved: 1) the derivation of 6 MPMs, and 2) entropy coding of 6 MPMs and non-MPM modes.

In the JEM, the modes included into the MPM lists are classified into three groups: Neighbor intra modes, Derived intra modes, and Default intra modes.

Five neighboring intra prediction modes are used to form the MPM list. Those locations of the 5 neighboring blocks are the same as those used in the merge mode, i.e., left (L), above (A), below-left (BL), above-right (AR), and above-left (AL) as shown in FIG. 1C. An initial MPM list is formed by inserting 5 neighbor intra modes and the planar and DC modes into the MPM list. A pruning process is used to remove duplicated modes so that only unique modes can be included into the MPM list. The order in which the initial modes are included is: left, above, planar, DC, below-left, above-right, and then above-left.

If the MPM list is not full (i.e., there are less than 6 MPM candidates in the list), derived modes are added; these intra modes are obtained by adding −1 or +1 to the angular modes that are already included in the MPM list. Such additional derived modes are not generated from the non-angular modes (DC or planar). Finally, if the MPM list is still not full, the default modes are added in the following order: vertical, horizontal, mode 2, and diagonal mode. As a result of this process, a unique list of 6 MPM modes is generated.

For entropy coding of the selected mode using the 6 MPMs, a truncated unary binarization is used. The first three bins are coded with contexts that depend on the MPM mode related to the bin currently being signaled. The MPM mode is classified into one of three categories: (a) modes that are predominantly horizontal (i.e., the MPM mode number is less than or equal to the mode number for the diagonal direction), (b) modes that are predominantly vertical (i.e., the MPM mode is greater than the mode number for the diagonal direction), and (c) the non-angular (DC and planar) class. Accordingly, three contexts are used to signal the MPM index based on this classification.

The coding for selection of the remaining 61 non-MPMs is done as follows. The 61 non-MPMs are first divided into two sets: a selected mode set and a non-selected mode set. The selected modes set contains 16 modes and the rest (45 modes) are assigned to the non-selected modes set. The mode set that the current mode belongs to is indicated in the bitstream with a flag. If the mode to be indicated is within the selected mode set, the selected mode is signaled with a 4-bit fixed-length code, and if the mode to be indicated is from the non-selected set, the selected mode is signaled with a truncated binary code.

In JEM, the non-MPM intra prediction mode number is not power of 2. As a result, the non-MPM mode can't be directly coded with fixed-length code which complicate the design of non-MPM mode coding.

In HEVC or JEM, the number of MPM is always fixed, which can be improved for better flexibility.

In current intra prediction design in HEVC and JEM, the intra prediction reference samples are not symmetrically utilized, i.e., only left and top reference samples are used but the right and bottom samples are not used since there are not available, however, the intra prediction directions are still symmetrically distributed and this may be not optimal.

For rectangular block, its width is not equal to height. Therefore, it is not optimal for rectangular block to use the same prediction modes with square block.

SUMMARY

According to embodiments, a method of controlling intra prediction for decoding of a video sequence, is performed by at least one processor and includes determining a total number of intra prediction modes for a current block, a number of Most Probable Modes (MPMs) in the current block, and a number of non-MPMs in the current block, wherein the total number of intra prediction modes for the current block is equal to a sum of the number of MPMs in the current block and the number of non-MPMs in the current block. The method further includes adjusting the total number of intra prediction modes to a value such that the number of non-MPMs is a power of 2 or a sum of multiple power of 2.

According to embodiments, an apparatus for controlling intra prediction for decoding of a video sequence, includes at least one memory configured to store computer program code, and at least one processor configured to access the at least one memory and operate according to the computer program code. The computer program code includes first determining code configured to cause the at least one processor to determine a total number of intra prediction modes for a current block, a number of Most Probable Modes (MPMs) in the current block, and a number of non-MPMs in the current block, wherein the total number of intra prediction modes for the current block is equal to a sum of the number of MPMs in the current block and the number of non-MPMs in the current block. The computer program code further includes first adjusting code configured to cause the at least one processor to adjust the total number of intra prediction modes to a value such that the number of non-MPMs is a power of 2 or a sum of multiple power of 2.

According to embodiments, a non-transitory computer-readable storage medium stores instructions that cause a processor to determine a total number of intra prediction modes for a current block, a number of Most Probable Modes (MPMs) in the current block, and a number of non-MPMs in the current block, wherein the total number of intra prediction modes for the current block is equal to a sum of the number of MPMs in the current block and the number of non-MPMs in the current block. The instructions further cause the processor to adjust the total number of intra prediction modes to a value such that the number of non-MPMs is a power of 2 or a sum of multiple power of 2.

BRIEF DESCRIPTION OF THE DRAWINGS

Further features, the nature, and various advantages of the disclosed subject matter will be more apparent from the following detailed description and the accompanying drawings in which:

FIG. 1C illustrates neighboring blocks for MPM derivation;

FIG. 12 is a diagram of a computer system suitable for implementing embodiments.

DETAILED DESCRIPTION

Embodiments are directed to next-generation video coding technologies beyond HEVC. More specifically, improvements to directional intra prediction are described.

Methods described herein may be used separately or combined in any order.

Figure 1A:
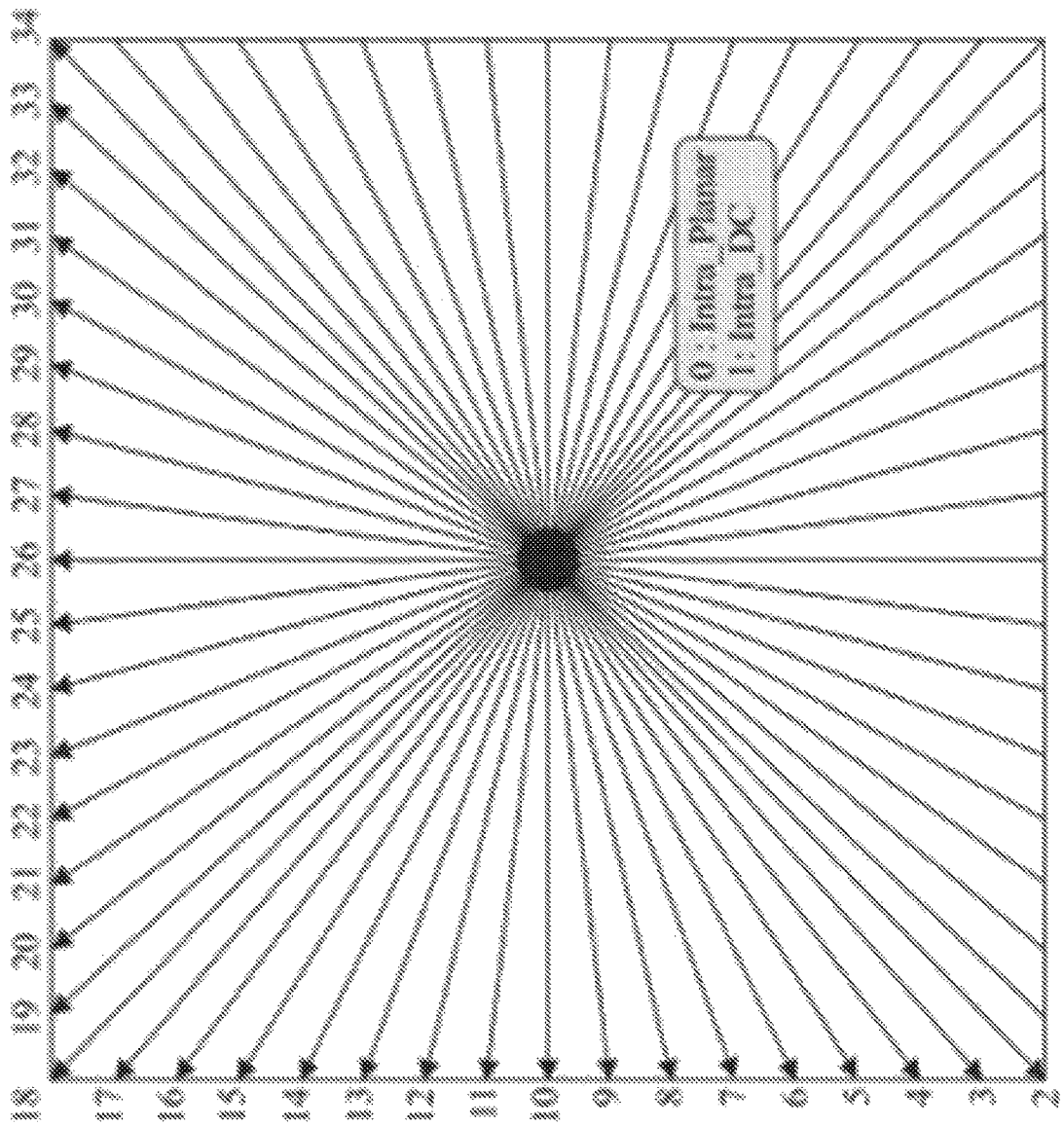
FIG. 1A is a diagram of 35 intra prediction modes in HEVC.
Figure 1B:
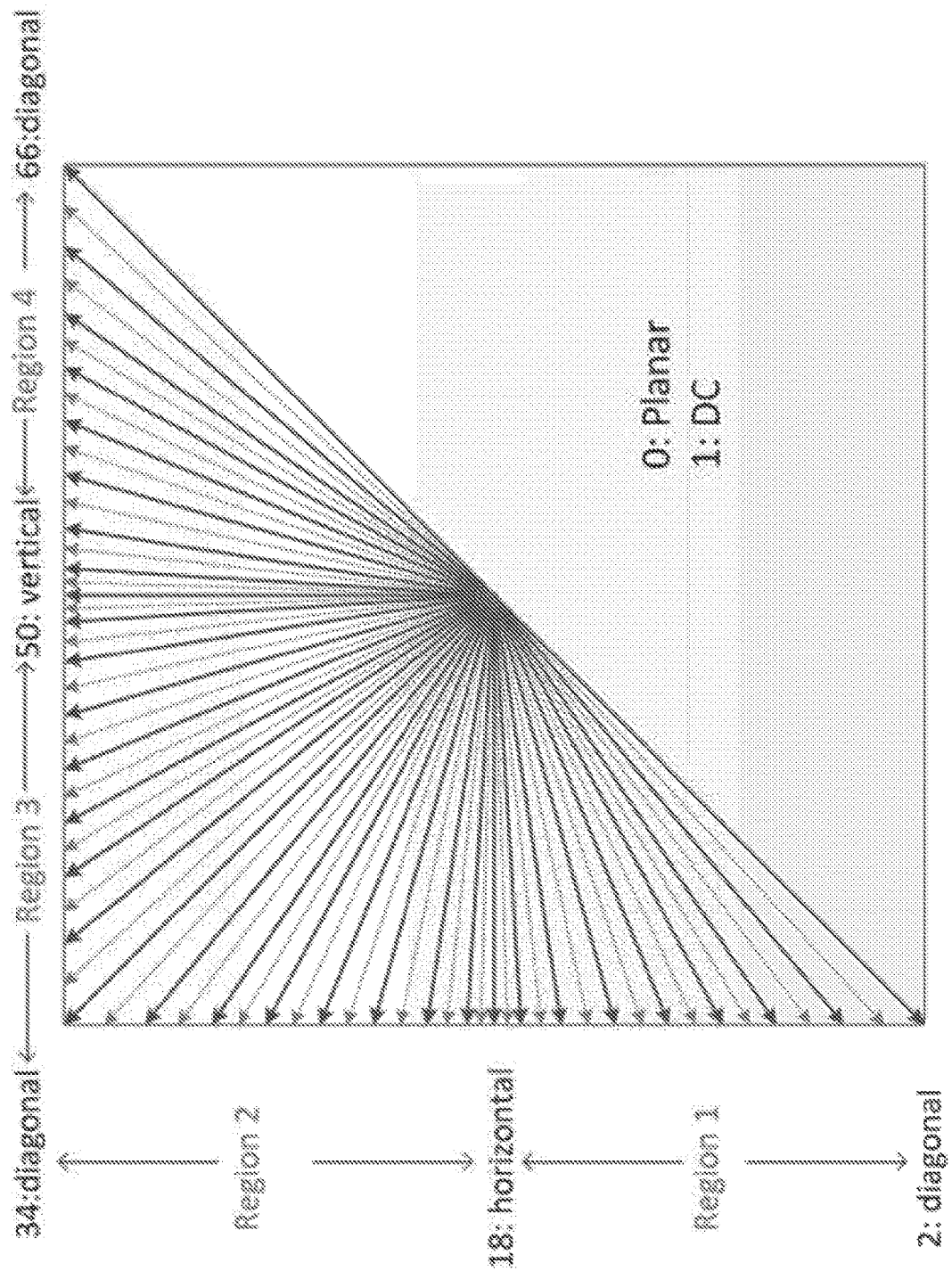
FIG. 1B is a diagram of 67 intra prediction modes in JEM.
Figure 2:
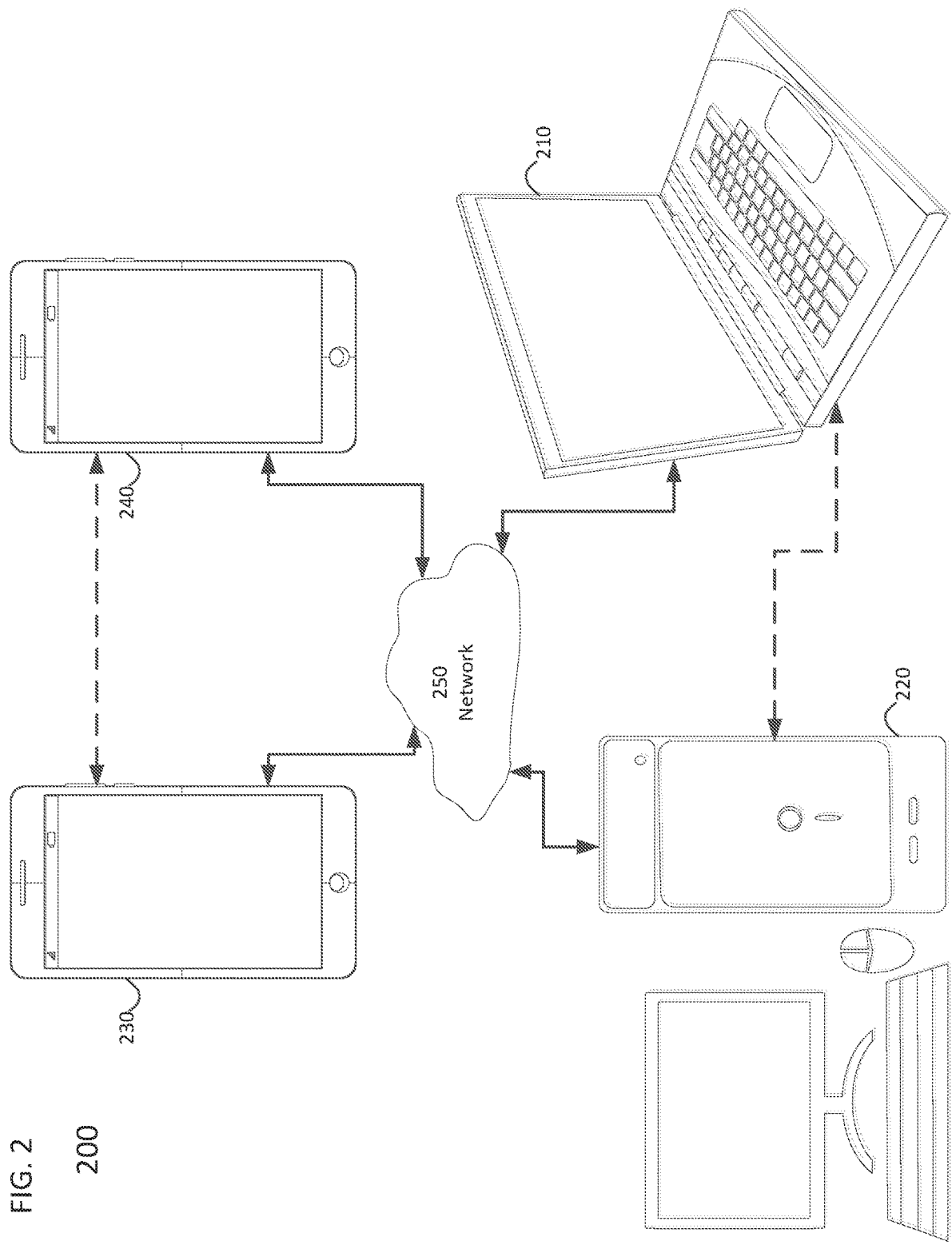
FIG. 2 is a simplified block diagram of a communication system according to an embodiment.

FIG. 2 illustrates a simplified block diagram of a communication system (200) according to an embodiment of the present disclosure. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure are not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
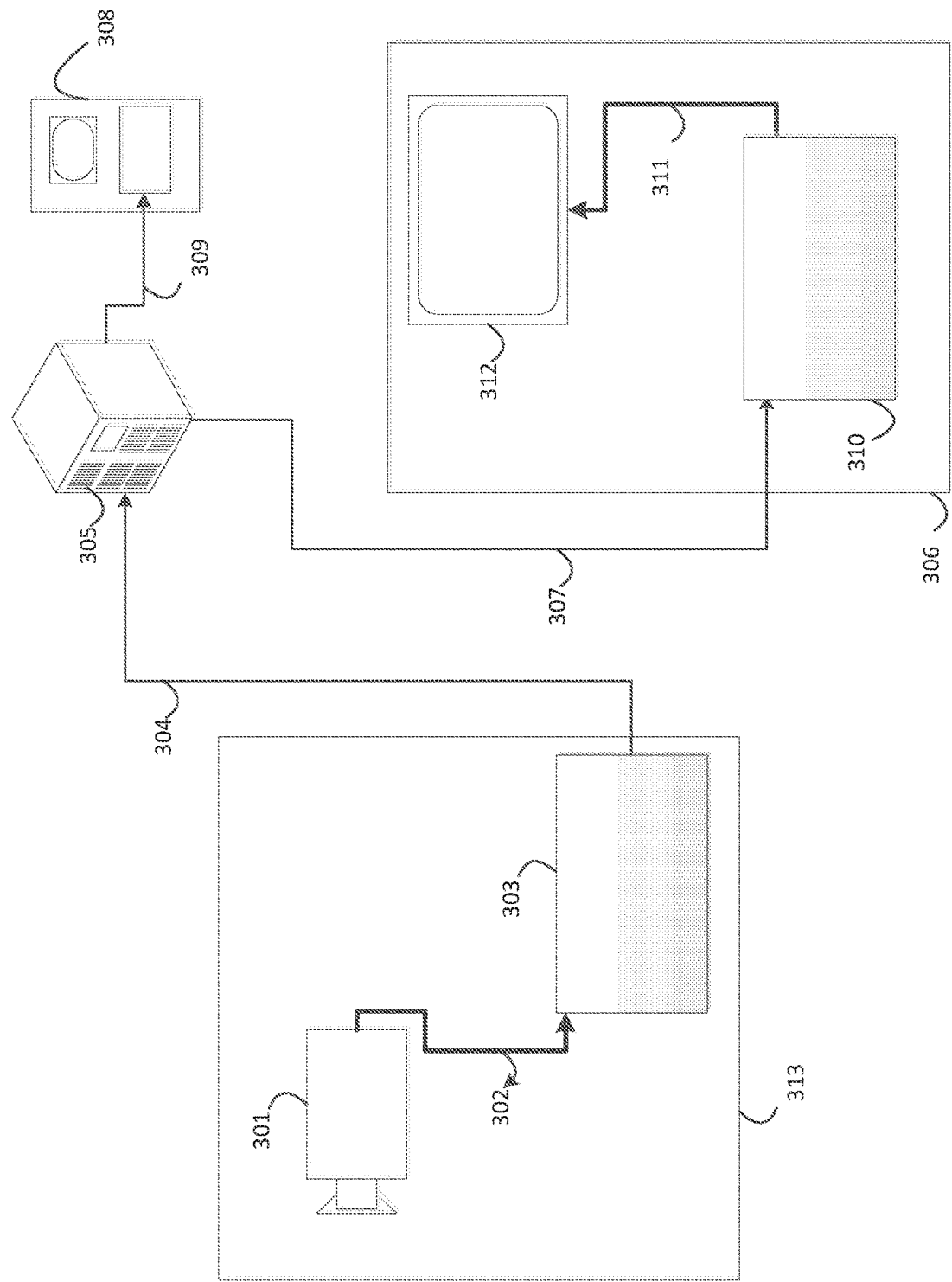
FIG. 3 is a diagram of a placement of a video encoder and a video decoder in a streaming environment, according to an embodiment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera 301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 4:
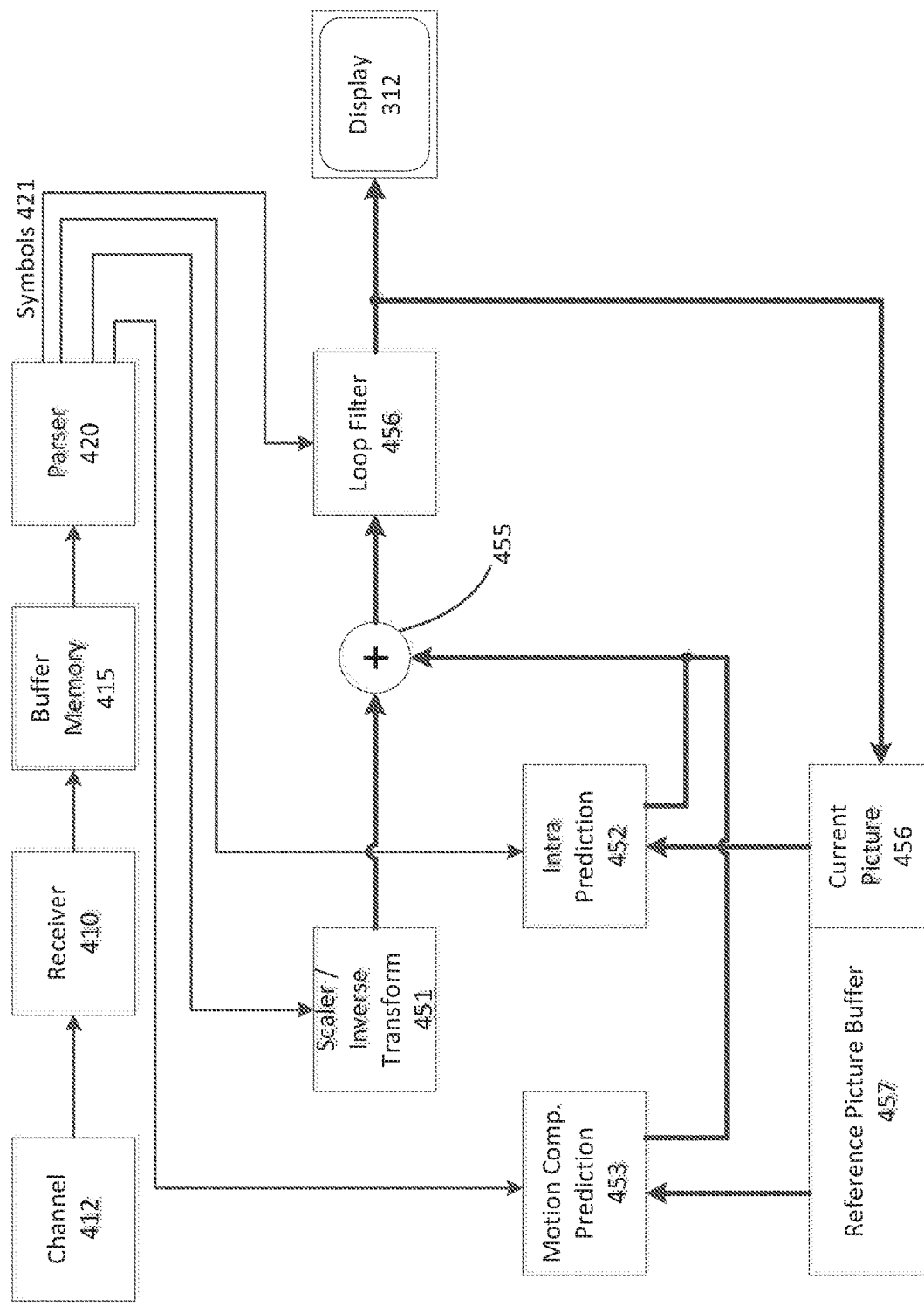
FIG. 4 is a functional block diagram of a video decoder according to an embodiment.

FIG. 4 may be a functional block diagram of a video decoder (310) according to an embodiment.

A receiver (410) may receive one or more codec video sequences to be decoded by the decoder (310); in the same or another embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction Unit (452), or a loop filter (456).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (621) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video bitstream and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (656) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 6:
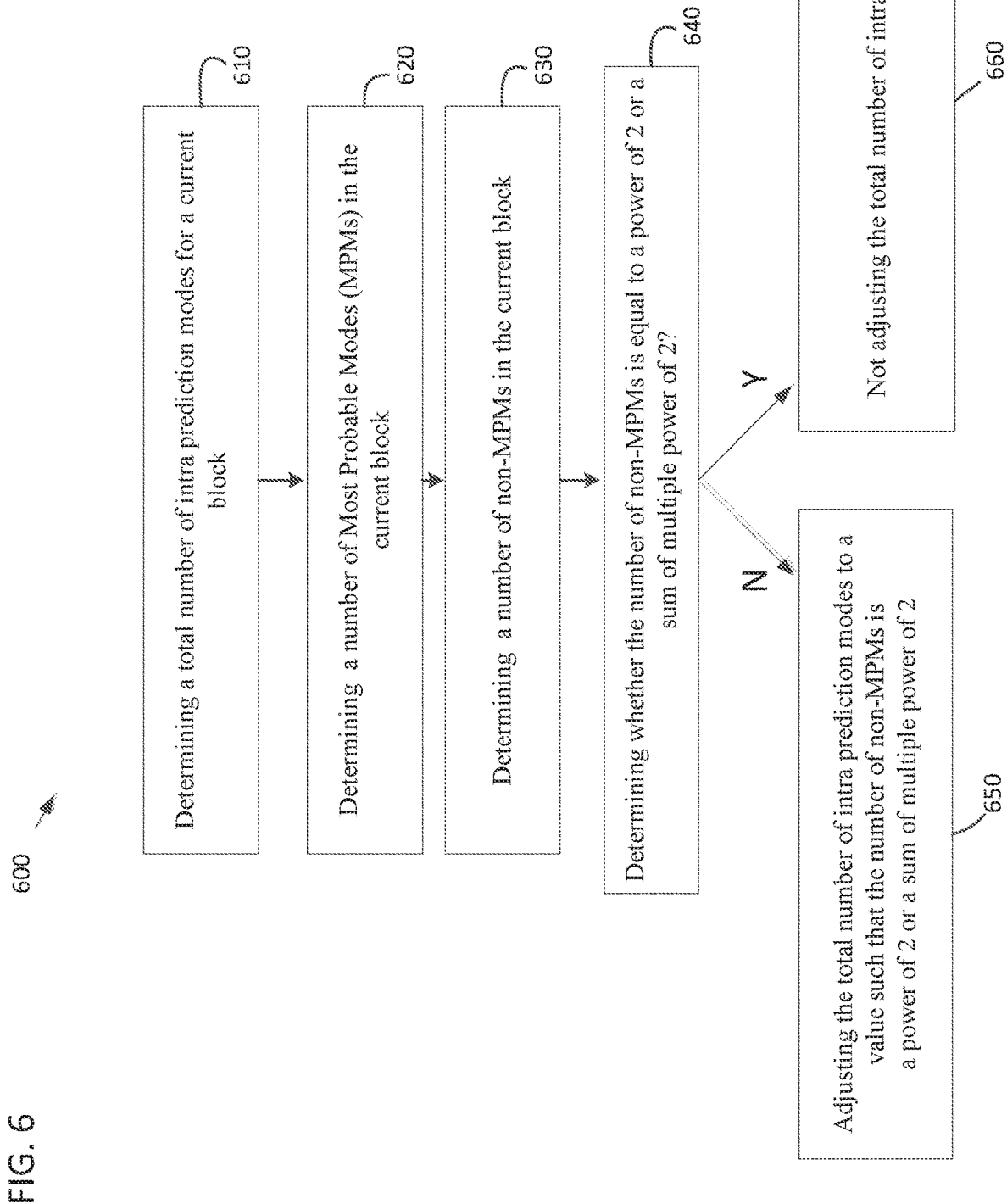
FIG. 6 is a flowchart illustrating a method of controlling intra and/or inter prediction for decoding of a video sequence, according to an embodiment.

FIG. 6 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

Figure 5:
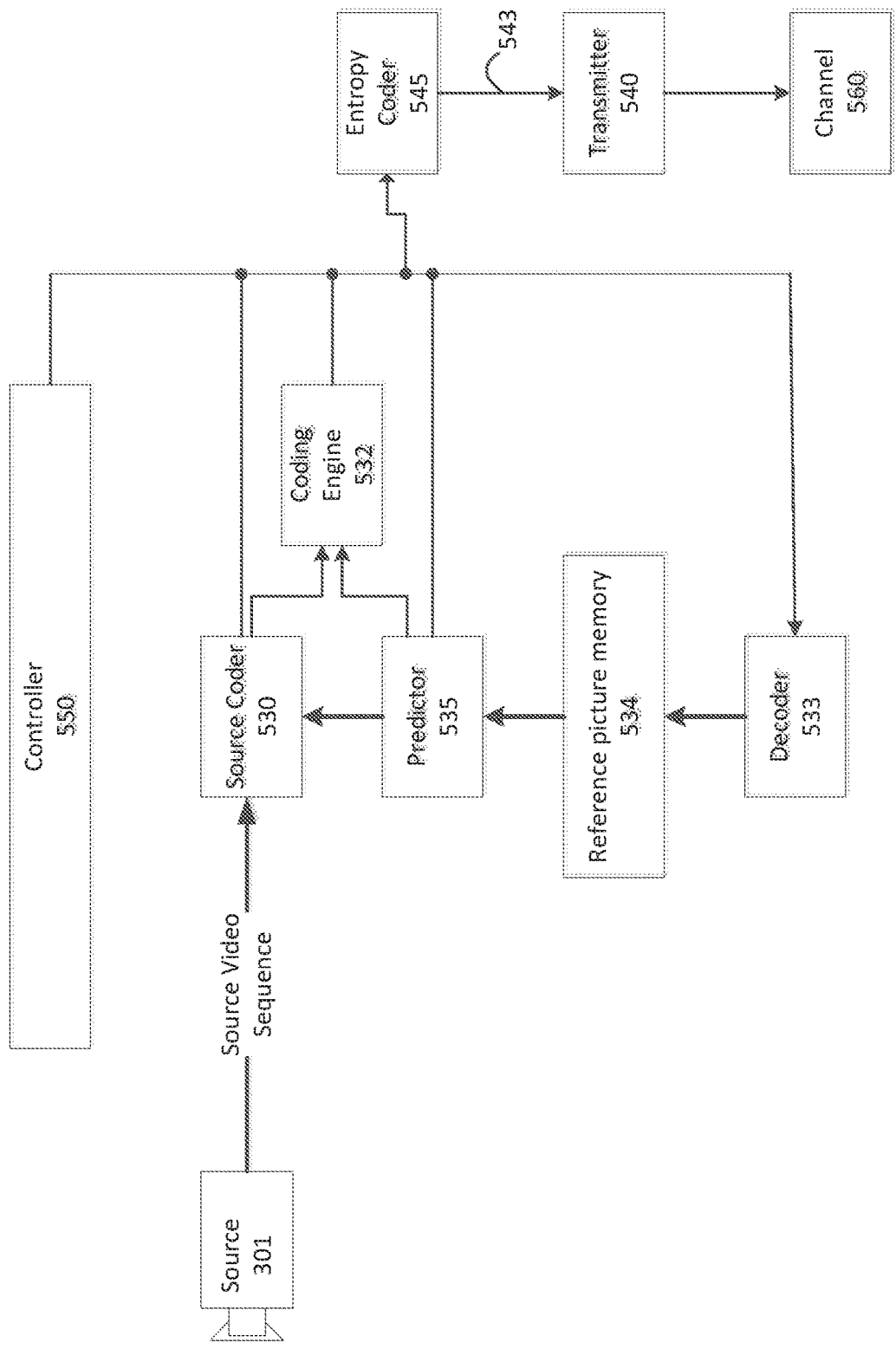
FIG. 5 is a functional block diagram of a video encoder according to an embodiment.

The operation of the "local" decoder (533) can be the same as of a "remote" decoder (310), which has already been described in detail above in conjunction with FIG. 4. Briefly referring also to FIG. 5, however, as symbols are available and encoding/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 6), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

FIG. 6 is a flowchart illustrating a method (600) of controlling intra and/or inter prediction for decoding of a video sequence, according to an embodiment. In some implementations, one or more process blocks of FIG. 6 may be performed by the decoder (310). In some implementations, one or more process blocks of FIG. 6 may be performed by another device or a group of devices separate from or including the decoder (310), such as the encoder (303).

Referring to FIG. 6, in a first block (610), the method (600) includes determining a total number of intra prediction modes for a current block. In a second block (620), the method (600) includes determining a number of Most Probable Modes (MPMs) in the current block. In a third block (630), the method includes determining a number of non-MPMs in the current block.

In a fourth block (640), the method (600) includes determining whether the number of non-MPMs is equal to a power of 2 or a sum of multiple power of 2. If it is determined that the number of non-MPMs is not equal to a power of 2 or a sum of multiple power of 2, the method (600) includes adjusting the total number of intra prediction modes to a value such that the number of non-MPMs is a power of 2 or a sum of multiple power of 2 (650). Otherwise, the method does not adjust the total number of intra prediction modes (660).

According to an embodiment, a method includes adjusting a non-MPM number as a power of 2, thus the total number of intra prediction modes may be calculated as follows:

$$modes_{total} = modes_{mpm} + 2^n \quad \text{(Equation 1)}$$

In the above equation 1, $modes_{total}$ indicates a total number of intra prediction modes for the current block, $modes_{mpm}$ is the number of MPM modes for the current block, $2^n$ can be the number of non-mpm modes, n is a positive integer.

According to an embodiment, the number of MPM modes is 6, n=6, then the total number of intra prediction modes is 70, the number of remaining modes is 64, which may be coded by 6 bins each, i.e. fixed length (6 bin) coding.

According to an embodiment, the number of MPM modes is 3, n=6, then the total number of intra prediction modes is 67, the number of remaining modes is 64, which may be coded by 6 bins each, i.e. fixed length (6 bin) coding.

According to an embodiment, an intra prediction mode number may be modified to make non-MPM number as power of 2. Total intra prediction modes can be formulated as:

$$modes_{total} = modes_{mpm} + 2^a + 2^b \quad \text{(Equation 2)}$$

In the above equation 2, $modes_{total}$ indicates the total intra prediction modes for current block, $modes_{mpm}$ is the MPM mode number for current block, $2^a$ can the number of first level non-MPM mode and $2^b$ can be the number of second level non-MPM modes, a and b are positive integer numbers.

According to an embodiment, the intra prediction mode number is increased to 70, the MPM number is still 6, and the non-MPM number is 64 ($2^6$=61+3). The increased 3 modes can be unidirectional prediction, and/or bi-directional prediction.

According to an embodiment, the intra prediction mode number is increased to 86, MPM mode number is 6, the non-MPM number has 2 levels, the first non-MPM level has 16 modes and the second non-MPM level has 64 modes. In other words, $86=6+2^4+2^6$. The increased 19 modes (86−67=19) can be unidirectional prediction, and/or bi-directional prediction.

According to an embodiment, the intra prediction mode number is modified to 54, $54=6+2^4+2^5$, MPM number is set to 6, the first level non-MPM is set to 16, and the second level non-MPM is set 32.

According to an embodiment, the number of non-MPMs is a sum of multiple power of 2, e.g., two power of 2 ($2^a+2^b$), three power of 2 ($2^a+2^b+2^c$).

According to an embodiment, a<b, or a≤b.

According to an embodiment, a method includes signaling the number of MPMs as a higher level syntax element, such as in sequence parameter set (SPS), picture parameter set (PPS), slice header, Tile header, coding tree unit (CTU) header, or as a common syntax element or parameter for a region of a picture. As a result, the length of MPM list can be different in different sequences, pictures, slices, tiles, group of coding blocks or a region of a picture.

According to an embodiment, for different number of MPMs, different sets of directional intra prediction modes are pre-defined such that the number of non-MPM is always a power of 2, or sum of multiples of power of 2.

According to an embodiment, only one set of directional intra prediction modes is defined for the maximum number of MPMs, when a reduced number of MPM is used, some directional intra prediction modes are disabled such that the number of non-MPM is always a power of 2, or sum of multiples of power of 2.

According to an embodiment, a method includes using asymmetric intra angular prediction for intra prediction. Asymmetric intra angular prediction refers to the mode number between horizontal/vertical mode and diagonal mode being different from mode number between horizontal/vertical mode and inverse diagonal mode.

Figure 7:
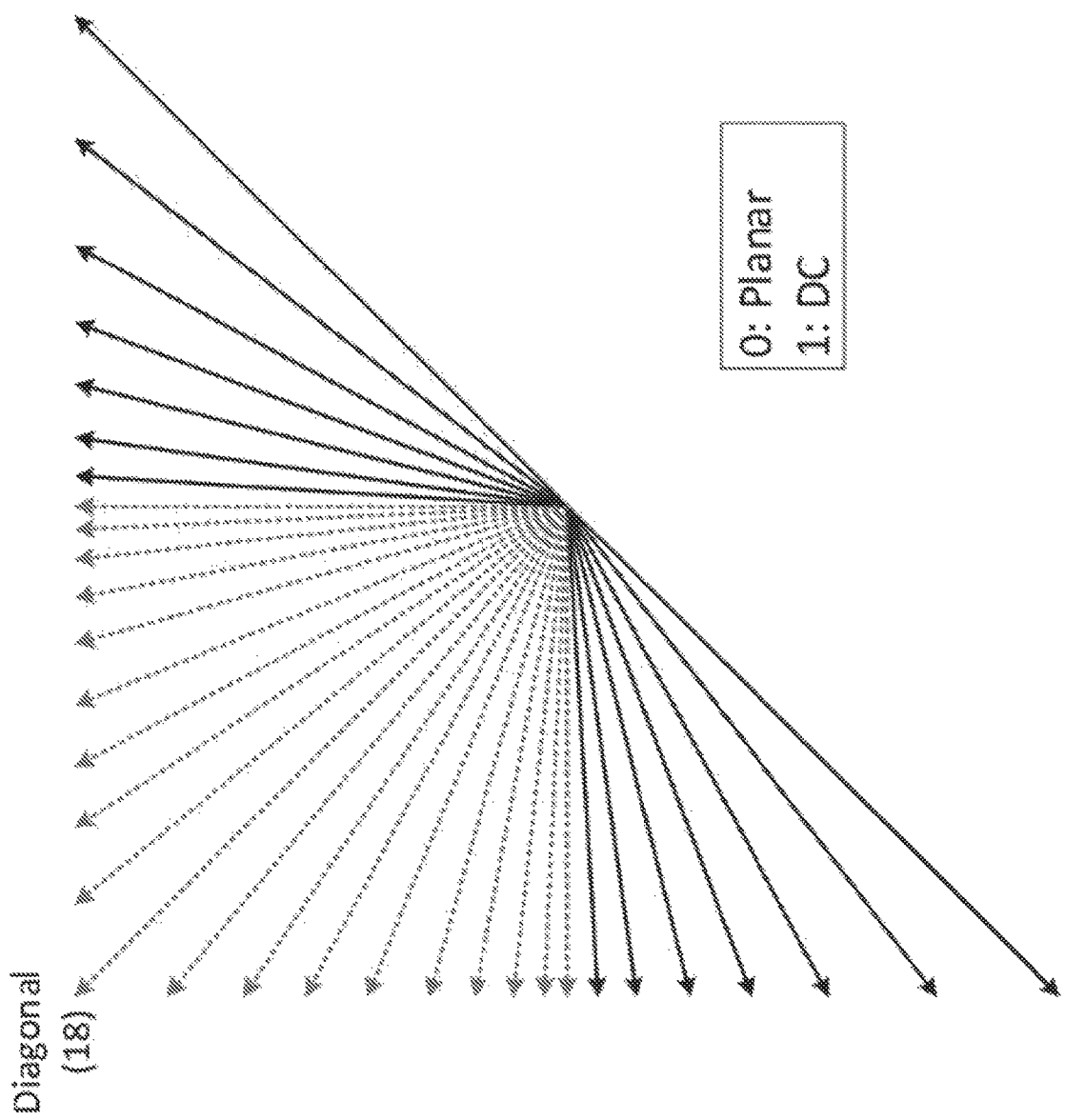
FIG. 7 is a diagram illustrating an example for asymmetric intra angular prediction modes, according to an embodiment.

FIG. 7 illustrates an example for asymmetric intra angular prediction modes. Referring to FIG. 7, the mode number of negative intra prediction directions (as indicated by 18 gray dotted arrows identified as Diagonal in FIG. 7) is larger/denser than the mode number of positive intra prediction directions (as indicated by solid arrows in FIG. 7). An example of asymmetric intra angular prediction modes is illustrated in FIG. 7 based on 35 intra prediction directions.

According to an embodiment, the intra prediction directions are symmetric along the diagonal intra prediction mode (as indicated in FIG. 7), but not symmetric along the vertical or horizontal directions.

Figure 8:
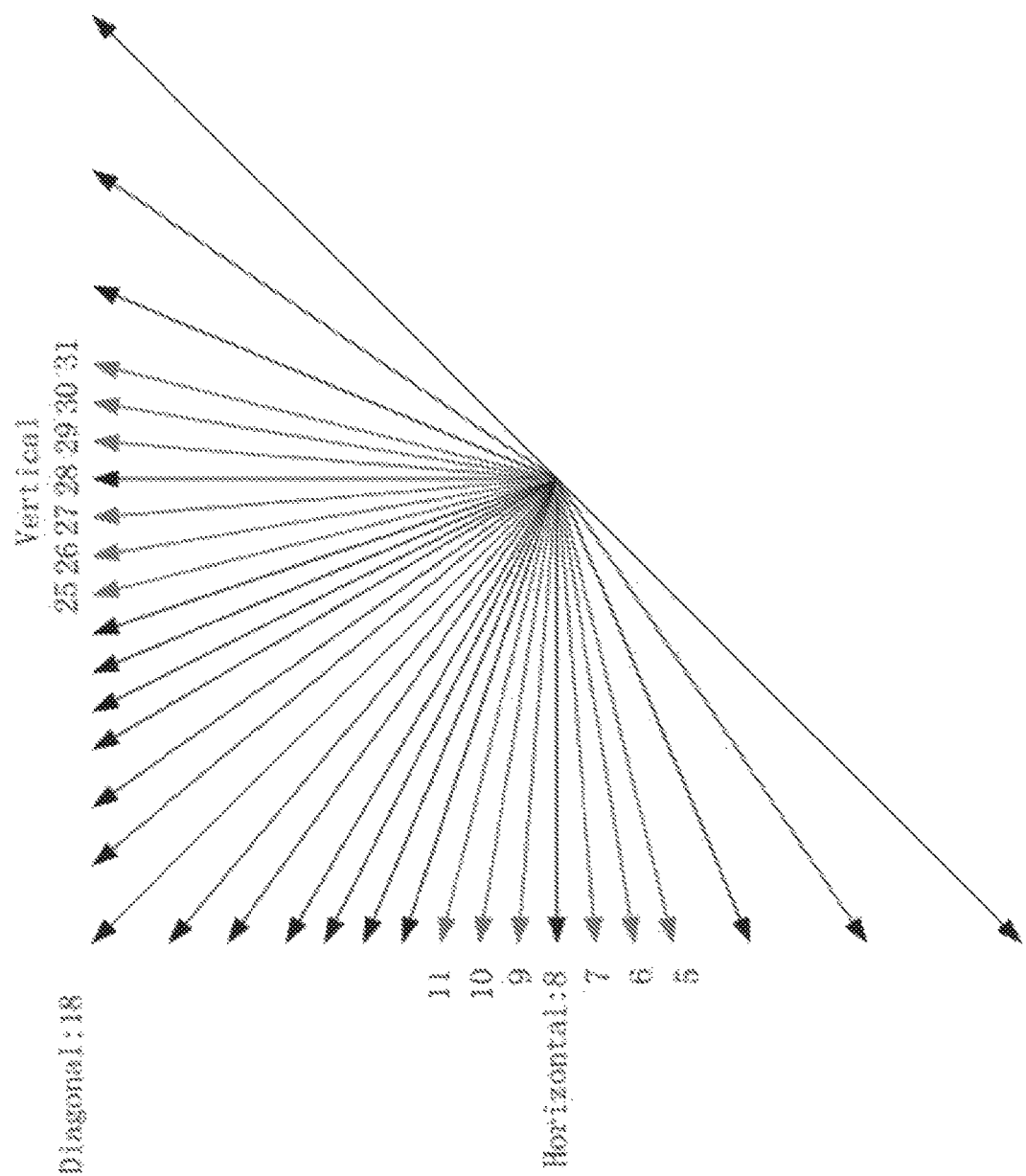
FIG. 8 is a diagram illustrating an example for asymmetric intra angular prediction modes, according to another embodiment.

FIG. 8 is a diagram illustrating an example for asymmetric intra angular prediction modes, according to another embodiment. All the prediction directions are symmetric along the diagonal intra prediction mode, and only certain intra prediction mode index close to horizontal direction and vertical direction are symmetric along the horizontal directions and vertical directions, and whether an intra prediction mode index range is close to horizontal/vertical direction is decided by whether the absolute difference between the intra prediction mode index and horizontal (and/or vertical) direction is smaller than or equal to a give threshold, e.g., 3 in below example. In FIG. 8, all intra prediction directions are symmetric along diagonal intra prediction mode (mode 18), mode 5-mode 11 are symmetric along horizontal direction, mode 25-mode 31 are symmetric along vertical direction, and other modes are not symmetric along the horizontal direction or vertical direction.

According to an embodiment, a definition of intra prediction directions may depend on coded information or any other information known to both encoder and decoder, including but not limited to block size, block height, block width, block shape, luma or chroma component, intra or inter slice, and block width to height ratio.

According to an embodiment, for larger block sizes, e.g., block sizes greater than a threshold, the intra prediction directions are more evenly distributed, and for smaller block sizes, e.g. block sizes smaller than a threshold, the intra prediction directions are more concentrated to the vertical and horizontal modes.

According to an embodiment, for blocks with sizes larger than a threshold, the intra prediction directions are denser around the vertical and horizontal prediction directions, while for block with sizes smaller than a threshold, the intra prediction directions are evenly distributed along the sides of the current block.

According to an embodiment, for block sides longer than a threshold and/or shorter than another threshold, e.g. by number of pixels, the intra prediction directions are evenly distributed along the sides.

According to an embodiment, for block sides longer than a threshold or shorter than another threshold, e.g. by number of pixels, the intra prediction directions are evenly distributed along the sides.

Figure 9A:
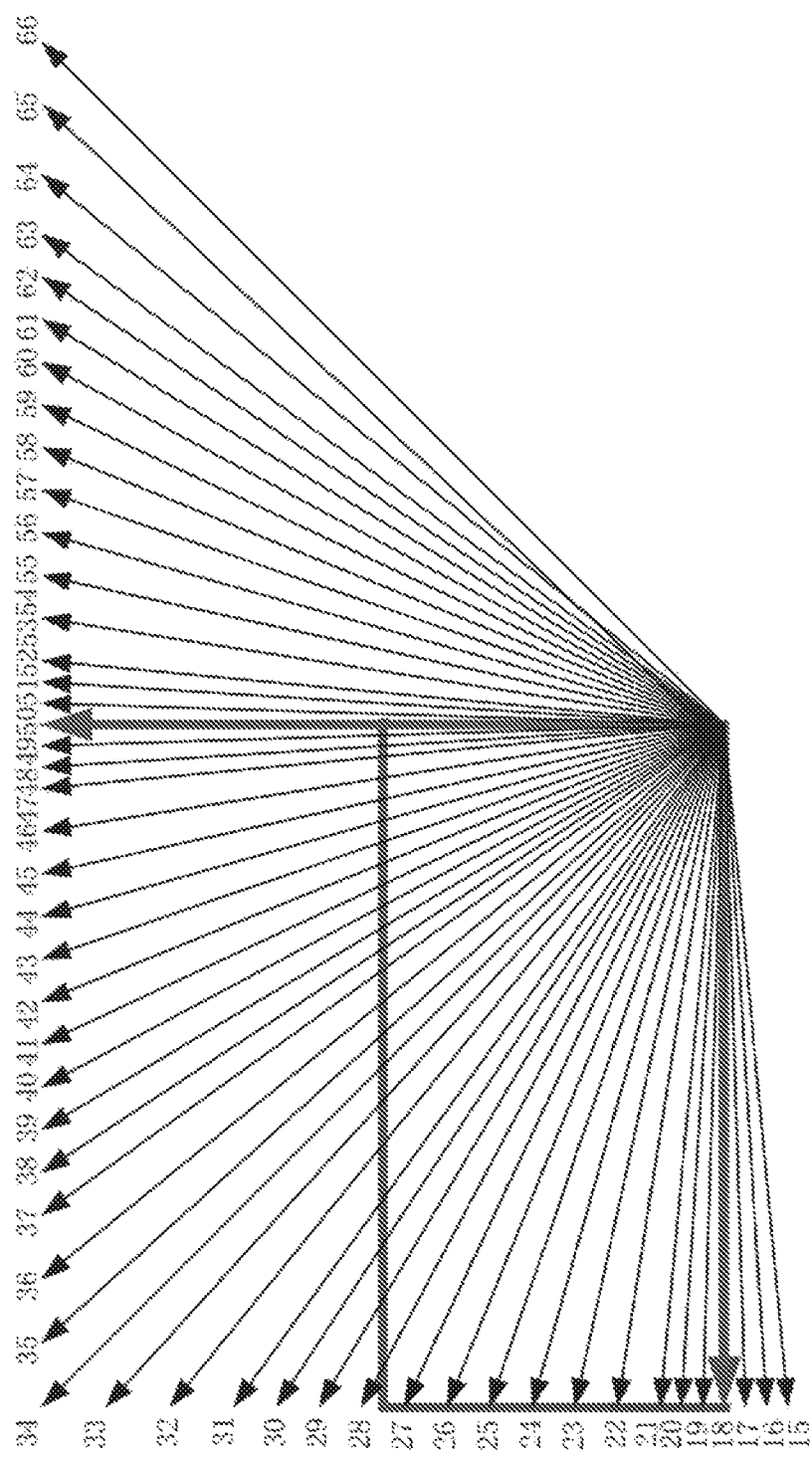
FIGS. 9A, 9B, and 9C are diagrams illustrating an example of intra prediction modes for a rectangular block, according to another embodiment.
Figure 9B:
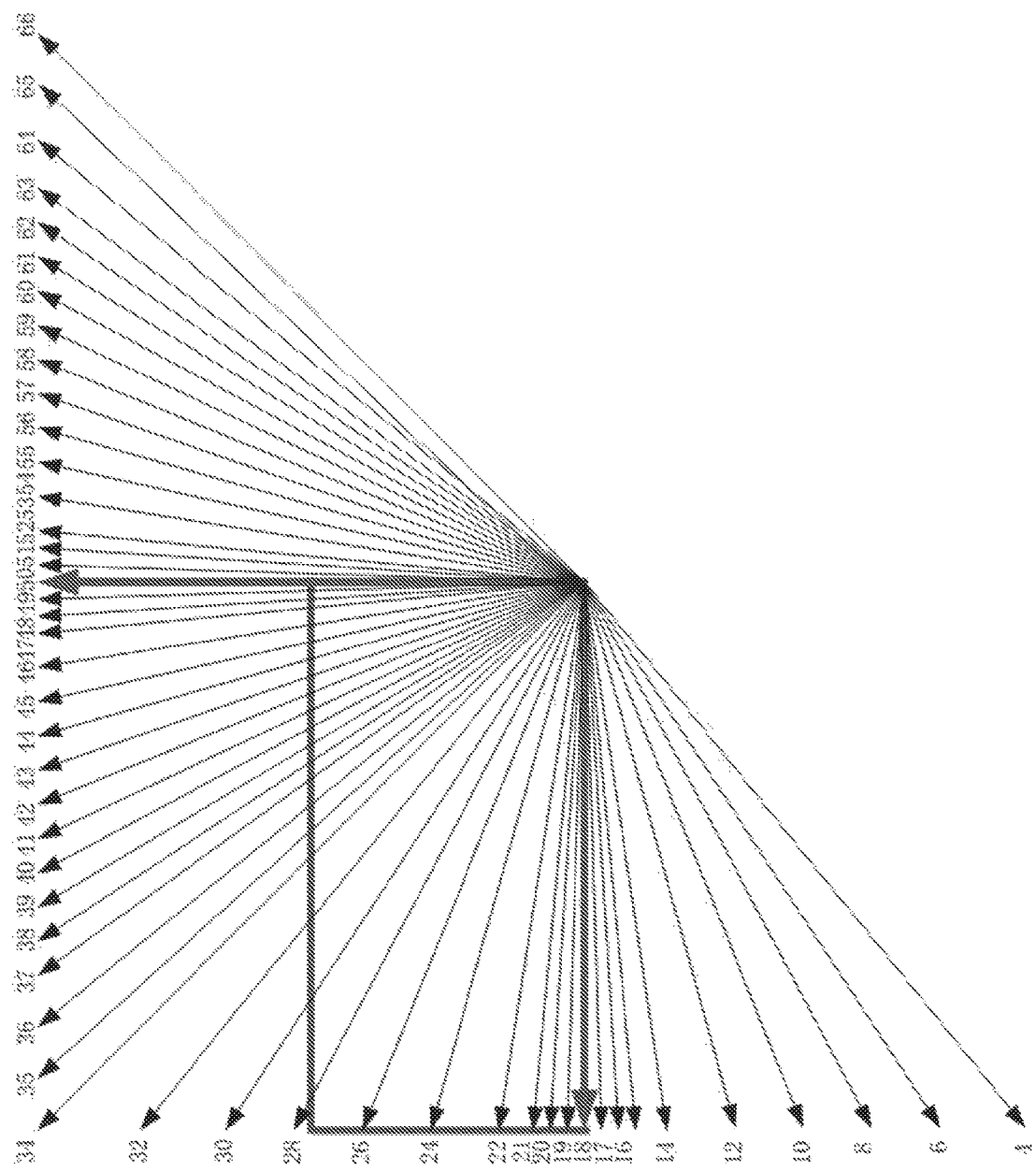
Figure 9C:
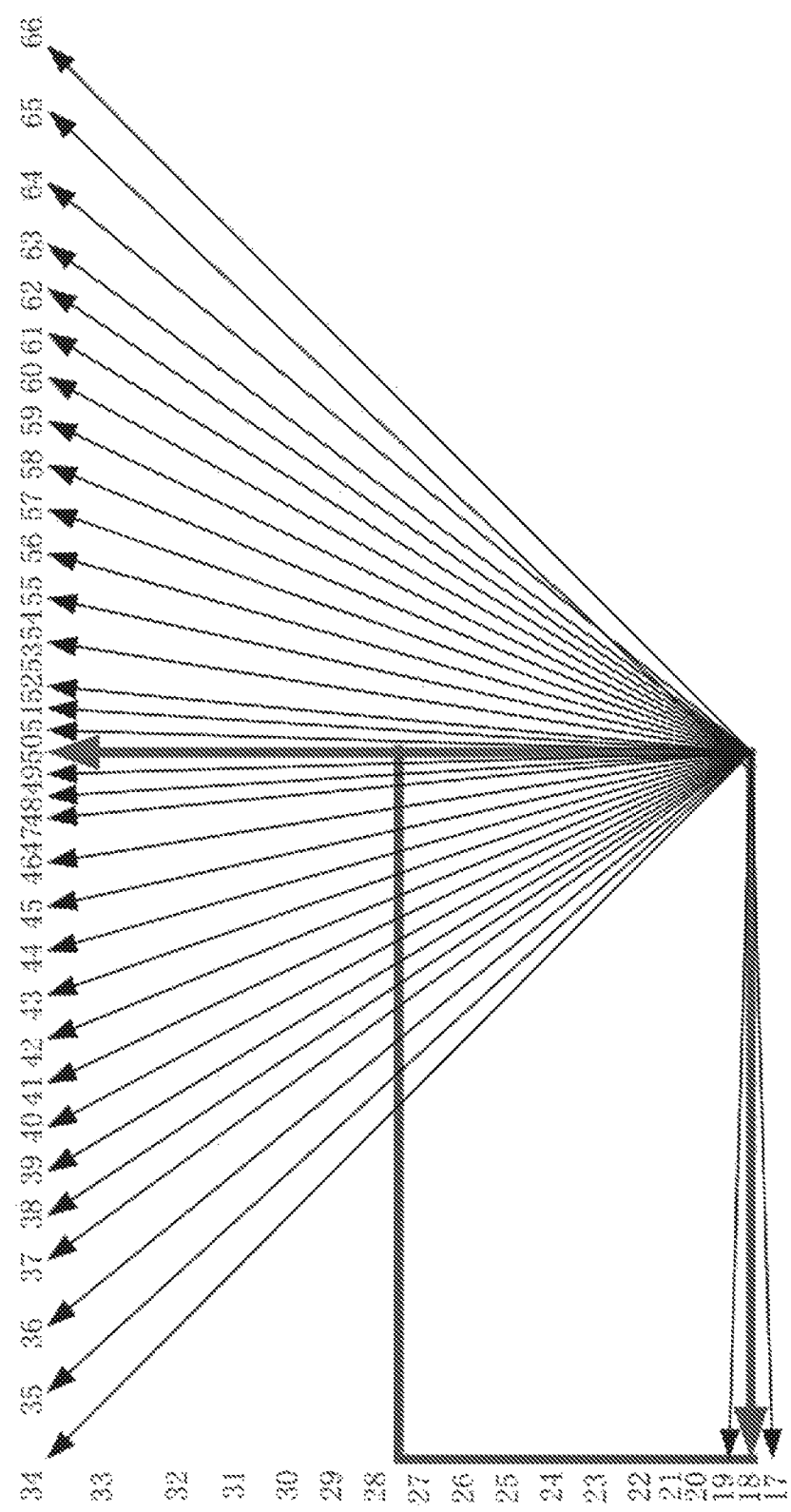

According to an embodiment, for non-square block, the intra prediction directions along the long side are denser than that along the short side. FIGS. 9A, 9B, and 9C illustrates 3 examples about this. The block size is 64×32. Width is the long side and height is the short side, and the prediction directions along the width are much denser than that along the height.

According to an embodiment, the ratio between the number of directional intra prediction modes along the horizontal side (width), denoted by M, and the number of directional intra prediction modes along the vertical side (height), denoted by N, of the current block, M:N, is proportional to the ratio of width:height. In one special case, these two mentioned ratios may be the same. For example, for a W×H (W or width=16, H or height=8 in this illustration) block, the number of directional intra prediction modes along height may be K (K=16 in this illustration) excluding the diagonal prediction direction, the number of directional intra prediction modes along width may be 2K (i.e. 32 in this illustration) excluding the diagonal prediction direction. Thus the total number of directional intra prediction modes for this W×H (16×8) block is 2K+K+1 (32+16+1 for diagonal direction).

According to an embodiment, for non-square block, some directional intra prediction modes are disabled such that the number of non-MPM is always a power of 2, or sum of multiples of power of 2. The disabled modes may be from only one mode set or from both 2 mode sets. And the disabled prediction direction may be evenly or un-evenly distributed in each mode set. After disabling some intra prediction modes, the modes for non-square block may be symmetric along vertical and horizontal direction, but not symmetric along diagonal direction.

FIGS. 9A, 9B, and 9C are diagrams illustrating examples of intra prediction modes for a rectangular block, according to another embodiment. FIGS. 9A, 9B, and 9C illustrate 3 examples and all the disabled intra prediction directions are from one mode set. In FIGS. 9A and 9B, the intra prediction modes are reduced to 54 modes. In FIG. 9A, mode 2~mode 14 are disabled. In FIG. 9B, modes near horizontal direction (modes 14~modes 22) are not sub-sampled and other modes in mode set 0 are subsampled at a factor of 2. 6 MPMs and 2 level non-MPMs (16+32) are used to encode these 54 modes. In FIG. 9C, the intra prediction modes are reduced to 38 modes. In mode set 0, only 3 modes near horizontal direction are selected, and other modes are disabled. For these 38 modes, 6 MPM and 1 level non-MPMs are used.

According to an embodiment, the intra prediction mode number for non-square block is still the same as that for square block, and the intra prediction modes for non-square block is symmetric along the horizontal direction and vertical direction, but not symmetric along the diagonal direction.

Figure 10:
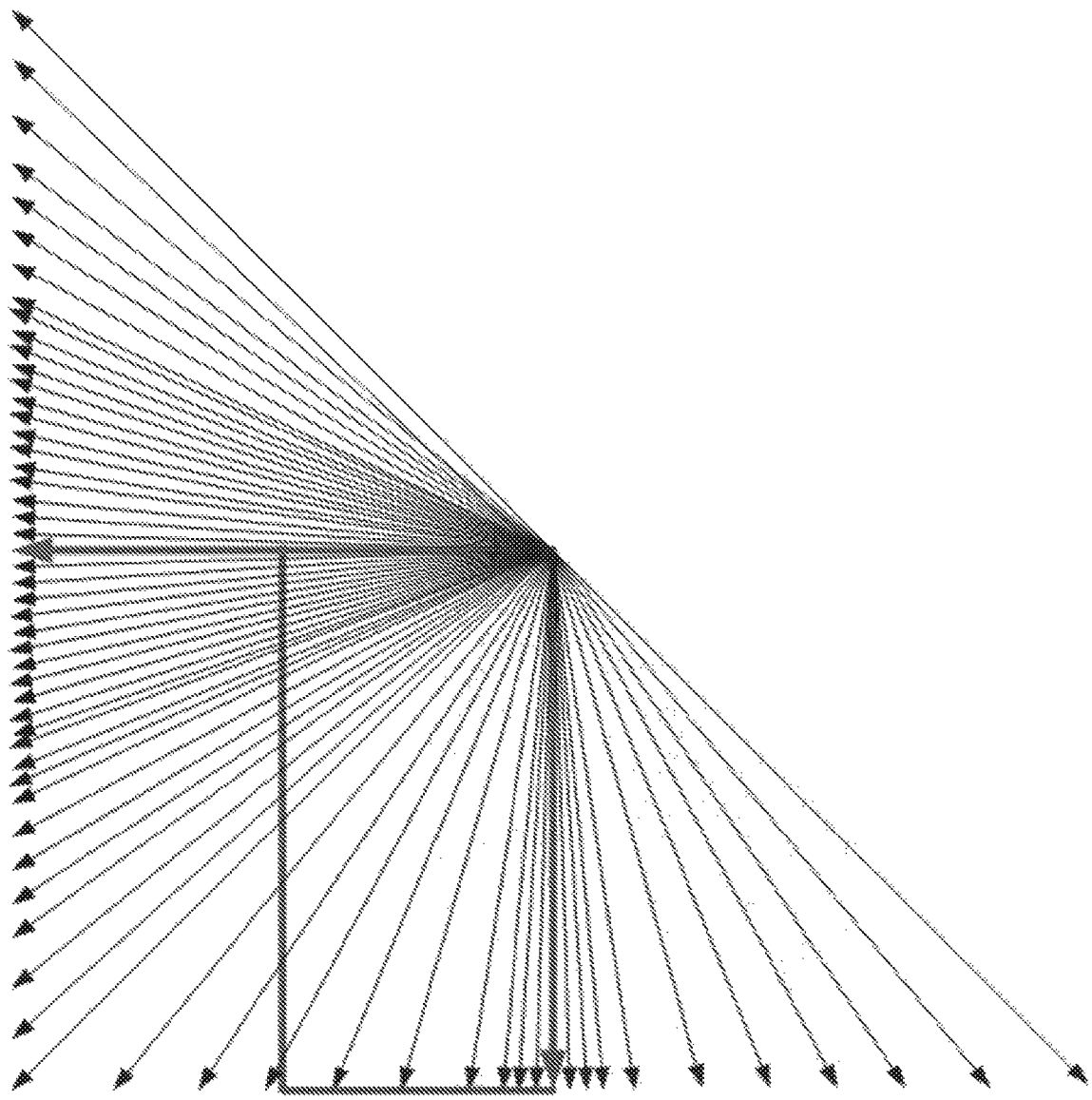
FIG. 10 is a diagram illustrating 12 modes removed from mode set 0, and 12 new modes are added.

FIG. 10 is a diagram illustrating 12 modes removed from mode set 0, and 12 new modes are added. As illustrated in FIG. 10, for non-square 64×32 block, 12 modes in mode set 0 are disabled, and 12 modes are added to mode set 1. The disabled modes and newly added modes are both symmetric to the horizontal direction or vertical direction. The directions for 12 disabled modes in mode set 0 are [7, 11, 15, 19, 23, 29]/32. The directions for these 12 new modes are [4, 6, 8, 10, 12, 14]/32.

According to an embodiment, the MPM derivation process may depend on coded information or any information that is available to both encoder and decoder, including but not limited to block size, block shape, block width, block height, block area size, number of total intra prediction modes, luma or chroma components.

According to an embodiment, a number of MPMs may depend on coded information or any information that is available to both encoder and decoder, including but not limited to block size, block width, block height, block area size, number of total intra prediction modes, luma or chroma components.

According to an embodiment, when different number of total intra prediction modes are applied to a certain block size, the number of MPMs can be different, e.g., if the total number of intra prediction modes is 35, 67 and 131, 3, 6 and 7 MPMs are used, respectively.

According to an embodiment, the order of adding the neighboring intra prediction modes into MPM list is decided by the shape of the block.

According to an embodiment, when width of current block is larger than the height of current block, modes of above side blocks are first inserted to MPM list followed by modes of left side block.

According to an embodiment, when width of current block is larger than the height of current block, the neighboring modes are added to MPM list in the following order: above→left→above right→above left→left bottom.

According to an embodiment, the default modes for filling the MPM list is decided by the shape of the block.

According to an embodiment, if the length of the MPM list is still less than the predefined number, the default mode set {Planar, DC, Horizontal, Vertical, Mode 34, Mode 66} are used to fill the MPM list.

According to an embodiment, the default mode set {Planar, DC, Vertical, Mode 34, Mode 2} are used to fill the MPM list for rectangular blocks whose height is larger than width.

According to an embodiment, for deriving N MPM list, when block width is larger than the height, horizontal prediction mode is forced to be added into the MPM list, otherwise vertical prediction mode is forced to be added into the MPM list, in this way, when deriving the non-MPM index, the complexity caused by the sorting process is reduced.

According to an embodiment, Planar and DC modes are always forced to be added into the MPM list together with vertical or horizontal mode, such that, it is only needed to sort N−3 modes when deriving the non-MPM index.

According to an embodiment, if the intra prediction modes for rectangular block is different from the squared block, the modes of the neighboring blocks may be mapped before inserting into the MPM list of current block.

According to an embodiment, if the modes of neighboring blocks are not included in the available modes of current rectangular block, these modes are mapped to its nearest mode which is included in the available modes of current rectangular block. If 2 nearest modes are found, these 2 modes are all added to the MPM list. For example, if Mode 5 is the mode of neighboring block, and mode 5 is not included in the available modes of current rectangular block. If mode 4 and mode 6 are both available for current block, mode 4 and mode 6 are all added into the MPM list.

According to an embodiment, if the modes of neighboring blocks are not included in the available modes of current rectangular block, these modes are not inserted into the MPM list.

According to an embodiment, to avoid duplicate intra prediction directions, the directional intra predictions include uni-directional intra prediction modes and bi-directional intra prediction modes, while the uni-directional intra prediction modes do not have duplicate directions and the bi-directional intra prediction use both top and left reference samples to do intra prediction.

Figure 11:
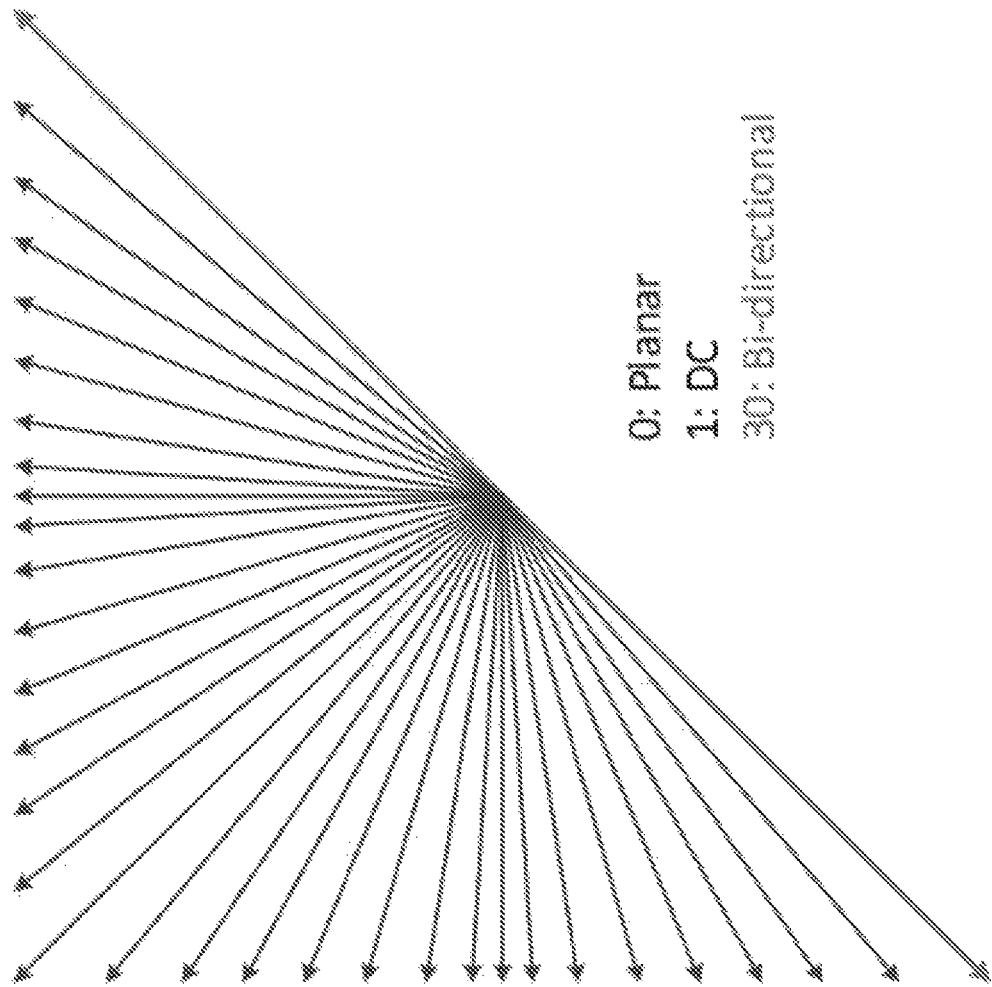
FIG. 11 is a diagram illustrating merged diagonal modes.

FIG. 11 is a diagram illustrating merged diagonal modes. As illustrated in FIG. 11, the intra prediction directions are still symmetric, and two diagonal modes are merged as one mode, such that the total number of intra prediction directions is reduced by 1. When bi-directional intra prediction is applied, the block is split into 2 regions, one is predicted using top reference samples, and the other is predicted using left reference samples. The samples close to the boundary of the two regions may be further weighted by two prediction values along the prediction direction.

According to an embodiment, to avoid parsing issue, when parsing the MPM index, the context used for decoding the MPM index is derived using the neighboring MPM index value. When parsing the flag indicating whether MPM is used or not, the MPM flag value of the left and/or above blocks are used to derive the context value. When parsing the bin i of binarized MPM index value, the context is derived by the value of bin i of the binarized MPM index of the top and left blocks.

Methods described herein may be implemented by processing circuitry (e.g., one or more processors or one or more integrated circuits). In one example, the one or more processors execute a program that is stored in a non-transitory computer-readable medium to perform one or more of the methods.

The techniques described above, can be implemented as computer software using computer-readable instructions and physically stored in one or more computer-readable media. For example, FIG. 12 shows a computer system 1200 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 12 for computer system 1200 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1200.

Computer system 1200 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1201, mouse 1202, trackpad 1203, touch screen 1210, data-glove 1204, joystick 1205, microphone 1206, scanner 1207, camera 1208.

Computer system 1200 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1210, data-glove 1204, or joystick 1205, but there can also be tactile feedback devices that do not serve as input devices), audio output devices (such as: speakers 1209, headphones (not depicted)), visual output devices (such as screens 1210 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1200 can also include human accessible storage devices and their associated media such as optical media including CD/DVD ROM/RW 1220 with CD/DVD or the like media 1221, thumb-drive 1222, removable hard drive or solid state drive 1223, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1200 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example universal serial bus (USB) ports of the computer system 1200; others are commonly integrated into the core of the computer system 1200 by attachment to a system bus as described below (for example Ethernet interface into a PC computer system or cellular network interface into a smartphone computer system). Using any of these networks, computer system 1200 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1240 of the computer system 1200.

The core 1240 can include one or more Central Processing Units (CPU) 1241, Graphics Processing Units (GPU) 1242, specialized programmable processing units in the form of Field Programmable Gate Areas (FPGA) 1243, hardware accelerators for certain tasks 1244, and so forth. These devices, along with Read-only memory (ROM) 1245, Random-access memory (RAM) 1246, internal mass storage such as internal non-user accessible hard drives, solid-state drives (SSDs), and the like 1247, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 1249. Architectures for a peripheral bus include peripheral component interconnect (PCI), USB, and the like.

CPUs 1241, GPUs 1242, FPGAs 1243, and accelerators 1244 can execute certain instructions that, in combination, can make up the aforementioned computer code. That computer code can be stored in ROM 1245 or RAM 1246. Transitional data can be also be stored in RAM 1246, whereas permanent data can be stored for example, in the internal mass storage 1247. Fast storage and retrieve to any of the memory devices can be enabled through the use of cache memory, that can be closely associated with one or more CPU 1241, GPU 1242, mass storage 1247, ROM 1245, RAM 1246, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1200, and specifically the core 1240 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1240 that are of non-transitory nature, such as core-internal mass storage 1247 or ROM 1245. The software implementing various embodiments of the present disclosure can be stored in such devices and executed by core 1240. A computer-readable medium can include one or more memory devices or chips, according to particular needs. The software can cause the core 1240 and specifically the processors therein (including CPU, GPU, FPGA, and the like) to execute particular processes or particular parts of particular processes described herein, including defining data structures stored in RAM 1246 and modifying such data structures according to the processes defined by the software. In addition or as an alternative, the computer system can provide functionality as a result of logic hardwired or otherwise embodied in a circuit (for example: accelerator 1244), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of controlling intra prediction for decoding of a video sequence, the method being performed by at least one processor, and the method comprising:
determining a total number of intra prediction modes for a current block, a number of Most Probable Modes (MPMs) in the current block, and a number of non-MPMs in the current block, wherein the total number of intra prediction modes for the current block is equal to a sum of the number of MPMs in the current block and the number of non-MPMs in the current block; and
adjusting the total number of intra prediction modes to a value that the number of non-MPMs is $2^a+2^b$, wherein a and b are positive integers and a does not equal b.

2. The method of claim 1, wherein the intra prediction modes comprise intra prediction directions, and the intra prediction directions are symmetric along a diagonal intra prediction mode and asymmetric along a vertical direction and a horizontal direction.

3. The method of claim 1, further comprising using asymmetric angular prediction such that a mode number between a horizontal/vertical mode and a diagonal mode is different from a mode number between the horizontal/vertical mode and an inverse diagonal mode.

4. The method of claim 1, further comprising using asymmetric angular prediction such that a mode number of negative intra prediction directions is larger than a mode number of positive intra prediction directions.

5. The method of claim 1, wherein the number of MPMs is adjusted according to any one or any combination of block size, block width, block height, and block area size.

6. The method of claim 1, wherein the MPMs are inserted into an MPM list that is accessed by the at least one processor.

7. The method of claim 6, further comprising:
when the number of MPMs in the MPM list is less than a predetermined number, adding neighboring intra prediction modes into an MPM list.

8. The method of claim 7, wherein the adding the neighboring intra prediction modes into the MPM list comprises adding the neighboring intra prediction modes into the MPM list according to an order based on a shape of the current block.

9. The method of claim 7, wherein the adding the neighboring intra prediction modes into the MPM list comprises, when a width of the current block is larger than a height of the current block, adding neighboring intra prediction modes of above side blocks to the MPM list before adding neighboring intra prediction modes of below side blocks to the MPM list.

10. The method of claim 7, wherein the adding the neighboring intra prediction modes into the MPM list comprises adding the neighboring intra prediction modes according to the following order: Planar, DC, Horizontal, Vertical, Mode 34, Mode 66.

11. An apparatus for controlling intra and/or inter prediction for decoding of a video sequence, the apparatus comprising:
at least one memory configured to store computer program code; and at least one processor configured to access the at least one memory and operate according to the computer program code, the computer program code comprising:
first determining code configured to cause the at least one processor to determine a total number of intra prediction modes for a current block, a number of Most Probable Modes (MPMs) in the current block, and a number of non-MPMs in the current block, wherein the total number of intra prediction modes for the current block is equal to a sum of the number of MPMs in the current block and the number of non-MPMs in the current block; and first adjusting code configured to cause the at least one processor to adjust the total number of intra prediction modes to a value that the number of non-MPMs is $2^a+2^b$ wherein a and b are positive integers and a does not equal b.

12. The apparatus of claim 11, wherein the intra prediction modes comprise intra prediction directions, and the intra prediction directions are symmetric along a diagonal intra prediction mode and asymmetric along a vertical direction and a horizontal direction.

13. The apparatus of claim 11, further comprising:
first using code configured to cause the at least one processor to use asymmetric angular prediction such that a mode number between a horizontal/vertical mode and a diagonal mode is different from a mode number between the horizontal/vertical mode and an inverse diagonal mode.

14. The apparatus of claim 11, further comprising:
first using code configured to cause the at least one processor to use asymmetric angular prediction such that a mode number of negative intra prediction directions is larger than a mode number of positive intra prediction directions.

15. The apparatus of claim 11, wherein the number of MPMs is adjusted according to any one or any combination of block size, block width, block height, and block area size.

16. The apparatus of claim 11, wherein the MPMs are inserted into an MPM list that is accessed by the at least one processor.

17. The apparatus of claim 16, further comprising:
first adding code configured to cause the at least one processor to, when the number of MPMs in the MPM list is less than a predetermined number, add neighboring intra prediction modes into an MPM list.

18. The apparatus of claim 17, wherein the first adding code is further configured to cause the at least one processor to add the neighboring intra prediction modes into the MPM list according to an order based on a shape of the current block.

19. The apparatus of claim 17, wherein the first adding code is further configured to cause the at least one processor to, when a width of the current block is larger than a height of the current block, add neighboring intra prediction modes of above side blocks to the MPM list before adding neighboring intra prediction modes of below side blocks to the MPM list.

20. A non-transitory computer-readable storage medium storing instructions that cause a processor to:
determine a total number of intra prediction modes for a current block, a number of Most Probable Modes (MPMs) in the current block, and a number of non-MPMs in the current block, wherein the total number of intra prediction modes for the current block is equal to a sum of the number of MPMs in the current block and the number of non-MPMs in the current block; and adjust the total number of intra prediction modes to a value that the number of non-MPMs is $2^a+2^b$, wherein a and b are positive integers and a does not equal b.

* * * * *